United States Patent [19]

Brok et al.

[11] 3,832,682

[45] Aug. 27, 1974

[54] READING APPARATUS

[75] Inventors: Wilhelm Fredrik Brok, Voorburg; Arie Adriaan Spanjersberg, Leiderdrop; Joannes Van Staveren, Zoetermeer, all of Netherlands

[73] Assignee: De Staat Der Nederlanden ten deze vertegenwoordigl door de Directeur-Generaal der Posterijen, Telegrafie & Telefonie, The Hague, Netherlands

[22] Filed: July 19, 1972

[21] Appl. No.: 273,332

[30] Foreign Application Priority Data

July 22, 1971 Netherlands ....................... 7110114

[52] U.S. Cl. ....................................... 340/146.3 ED

[51] Int. Cl. ......................... G06k 5/00, G06k 15/20

[58] Field of Search ......... 340/146.3 ED, 146.3 AQ, 340/146.3 R

[56] References Cited

UNITED STATES PATENTS

| | | | |
|---|---|---|---|
| 3,182,290 | 5/1965 | Rabinow | 340/146.3 AQ |
| 3,492,646 | 1/1970 | Bene et al. | 340/146.3 ED |
| 3,439,986 | 4/1969 | Moore | 340/146.3 ED |
| 3,160,855 | 12/1964 | Holt | 340/146.3 ED |
| 3,271,738 | 9/1966 | Kamentsky | 340/146.3 ED |
| 3,156,894 | 11/1964 | Greanias | 340/146.3 ED |

*Primary Examiner*—Paul J. Henon
*Assistant Examiner*—Leo H. Boudreau
*Attorney, Agent, or Firm*—Hugh Adam Kirk

[57] ABSTRACT

A reading apparatus for processing symbols handwritten on a recording card in combined mechanical and manual fashion, in which the mechanical automatic reading is by recognition logic for classifying the symbols read, and the symbols that are not so recognized or are uncertain are visualized on a central monitor. Thus a second classification device is provided by means of which an unrecognized symbol can be converted into uncertainty indications, and with an auxiliary encoding device having a monitor for the symbol and a manual keying device for the symbol viewed on the monitor, a comparison is made with this keyed symbol and the two closest classified logic indications for that symbol, and if one corresponds to the keyed symbol, it is then selected and processed in the reading machine.

11 Claims, 5 Drawing Figures

READING APPARATUS

BACKGROUND OF THE INVENTION

Hitherto it has appeared impossible to sufficiently accurately read handwritten symbols by means of an automatic reading machine only. That means, it is of course possible to read written symbols by means of a reading machine, but this entails an unacceptable high rejection rate. This is even the more so true when the data to be processed relate to money traffic. For postal transfer cards having an average of ten characters per card the rejection rate will probably amount to 30 to 50 percent of the cards offered. The rejected cards will have to be processed manually. The processing generally involves the punching of the symbols read in the appropriate code.

Knowing that among the rejected cards there will be many of which only one or a few characters cannot be recognized by the machine, it would be uneconomical to simply transfer the rejected cards to manual processing. Therefore possibilities have been conceived to combine the mechanical and manual processing in a special manner as defined in the introductory part. Such a reading apparatus is known and is marketed by the U.S. firm "Cognitronics Corporation," under the name "Cognitronics System/70" for Optical Character REcognition. In such a system the characters unrecognized by the apparatus are visualized on a display screen. The operator only has to key in these characters. The number of characters to be keyed in does not exceed 5 to 10 percent of the total number of characters to be processed.

Particularly for money traffic through the postal clearing service, which does not allow any error, this procedure has the drawback that afterwards a check is required to prevent the relatively high error rate of the manual processing.

It is an object of the invention to simplify this check a great deal by using the automatic reading machine for this check.

SUMMARY OF THE INVENTION

This is an improvement for one of applicants' copending U. S. Pat. application Ser. No. 225,839, filed Feb. 14, 1972 for a "System for Automatically Reading Symbols" of Spanjersberg and which is assigned to the same assignee as this application.

The invention relates to a reading apparatus for handwritten symbols and, particularly, to a reading apparatus for processing symbols handwritten on a recording carrier in combined mechanical and manual fashion, wherein at least one automatic reading machine having a recognition logic for deriving the features and classifying the symbols read is used for reading, and wherein the symbols of each recording carrier that have not been recognized by the automatic reading machine are visualized on a central monitor and, after subsequent visual recognition, one of these symbols is still processed by depressing its corresponding symbol key.

The object is achieved in accordance with the invention by an automatic reading machine comprising a second classification device by means of which an unrecognized symbol can be converted into uncertainty indications for two symbols, and an auxiliary encoding device adapted to mechanically ascertain whether the symbol keyed-in manually bears similarity to one of the uncertainty indications, in which case the apparatus accepts the symbol corresponding with that uncertainty indication.

The invention is based on the fact that in the recognition logic within the apparatus, a symbol will often be rejected because the results of certain measurements to this symbol have exceeded given limits. Outside these limits there may be confusion with another symbol. In other words, the symbol is rejected on account of the fact that the apparatus is uncertain as to which one of the two symbols is correct.

However, if in the case of a rejection the symbol keyed in by the operator is compared to the two "uncertainty symbols" present in the recognition logic, in the case of characters or digits 0 through 9, nine of the 10 possible key-in errors can be detected. Generally there are 11 possibilities, viz. the 10 different characters and a space for a blank square.

Consequently, the error rate of the manual processing is reduced by a factor of 10.

Although hereinafter attention is primarily paid to an application of the invention to traffic through the postal clearing service, it will be clear that the invention is not at all restricted thereto but can be used for reading all kinds of handwritten symbols and figures of which features and classifications derived from certain measurements to the elements of these symbols and figures can be stored in an image matrix and in numbers.

By the term "auxiliary encoding station" is understood the device permitting an operator, in cooperation with the automatic reading machine, to punch the incompletely recognized characters.

The processing rate of present-day punching apparatus is maximally 60 cards per minute.

An operator can easily key in four characters per second if the images thereof are presented in a horizontal row on the viewing screen (the central monitor). Consequently, one operator can punch the unrecognized characters of more than one automatic reading machine.

BRIEF DESCRIPTION OF THE VIEWS

The above mentioned and other features, objects and advantages, and a manner of attaining them are described more specifically below by reference to embodiments of this invention shown in the accompanying drawings, wherein.

DETAILED DESCRIPTION OF PREFERRED EMBODIMENTS

I Prior Art

Before discussing the reading apparatus in accordance with the invention in detail, some general observations will be made on the principle of automatic reading an the recognition logic portion 1 used therein.

Figure 1:
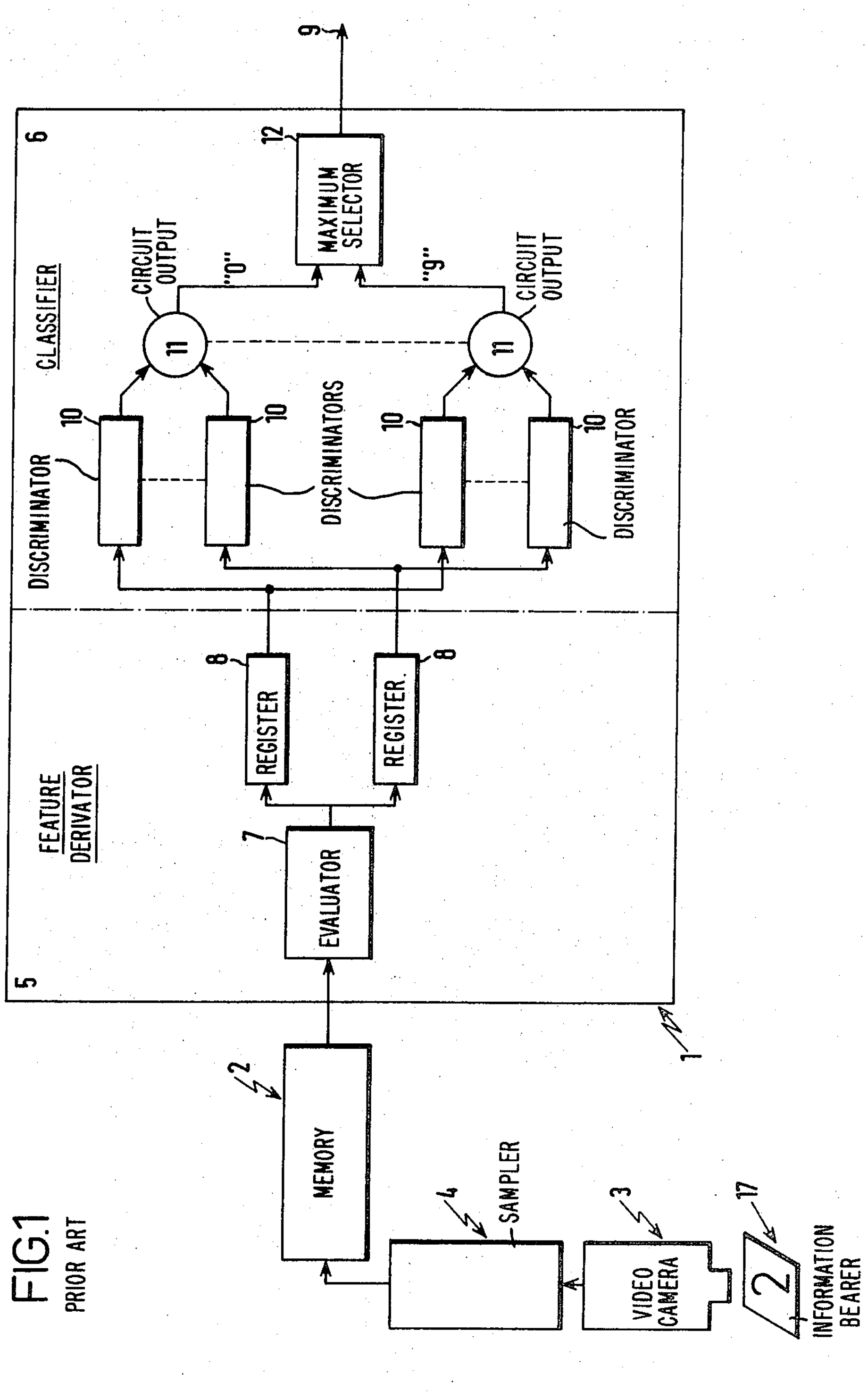
FIG. 1 shows a simplified schematic block wiring diagram of a known reading apparatus for elucidating the principle of automatic reading.

As shown in FIG. 1, the recognition logic provided in an automatic reading machine obtains its input data from a memory 2 wherein the image elements of the character read are stored. The image elements can be obtained by sampling (indicated by sampler 4) the quantisized video output of a TV camera 3 at given points of time. By this procedure the recorded character image can be converted into a matrix of e.g. 32 × 32 = 1024 binary image elements or bits.

Practically all recognition methods known can be divided into two parts: the derivation of the features (indicated by derivator 5) and the classification (indicated by classifier 6). During the derivation of the features certain "measurements" by evaluator 7 can be performed to the elements in the image matrix and the results are stored in numbers. The resultant numbers are called the "features" of the character read. Possible features are, i.a.:

1. Shapes of portions of the character, which shapes are encoded in digits, such as: straight line sections, curved line sections, parallel line sections, etc.
2. The number of times that an auxiliary line drawn in the image frame intersects the lines of the character.
3. The coordinates of beginnings and trifurcations or quadrifurcations in the character lines.
4. The direction coefficients of the character lines.
5. The "yes" or "no" reply, encoded in "1" or "0", resp., to questions such as: "Are there lines merging in he right-hand top corner?."

The values of the features found are stored as computer words in binary form in registers 8.

In the classification portion 6 of the automatic reading machine 1 the "degrees of correspondence" are determined which the character read has with prototypes of each one of the ten digits or characters to be read. If there is a clear correspondence with one of the prototypes and there is none or only very little correspondence with the other prototypes, the character value of the first-named prototype appears at the output 9 of the classification device. If no given minimal degree of correspondence is obtained with anyone of the prototypes, a rejection indication appears at the output of the classification device.

The degree of correspondence is determined by means of discriminators 10. A plurality of discriminators are present for each prototype, in which discriminators it is examined to what extent the feature values found correspond to the specific feature values of this prototype. If there is no correspondence, the output value of the discriminator is zero and this value increases in proportion to the degree of correspondence.

Generally the discriminators are dichotomic, that means the output value is zero as long as the degree of correspondence remains below a given value, and is "1" as soon as the degree of correspondence exceeds this value. Boolean features ("yes" or "no" replies) do not permit other discriminators.

The summated discriminator output 11 of the individual prototypes are applied to a maximum selector 12, which attends to the final classification.

Different variants of the above embodiment of the recognition logic are possible. Thus a minimum selector on the summated "0" outputs of the discriminators can be used instead of a maximum selector on the summated "1" outputs. The summation devices can be replaced by counters so as to sequentially perform the classification. The saving in material that may be the result thereof is at the expense of the processing time. However, this alters little the principle of the classification.

In order to prevent incorrect interpretations in uncertainty cases, the feature values in the discriminators should satisfy strict requirements. As a result thereof, only very seldom a character read will have a high degree of correspondence with prototypes of different characters. Consequently, upon rejection it will not be readily possible to place "uncertainty indications" on the output.

II THE INVENTION

Figure 2:
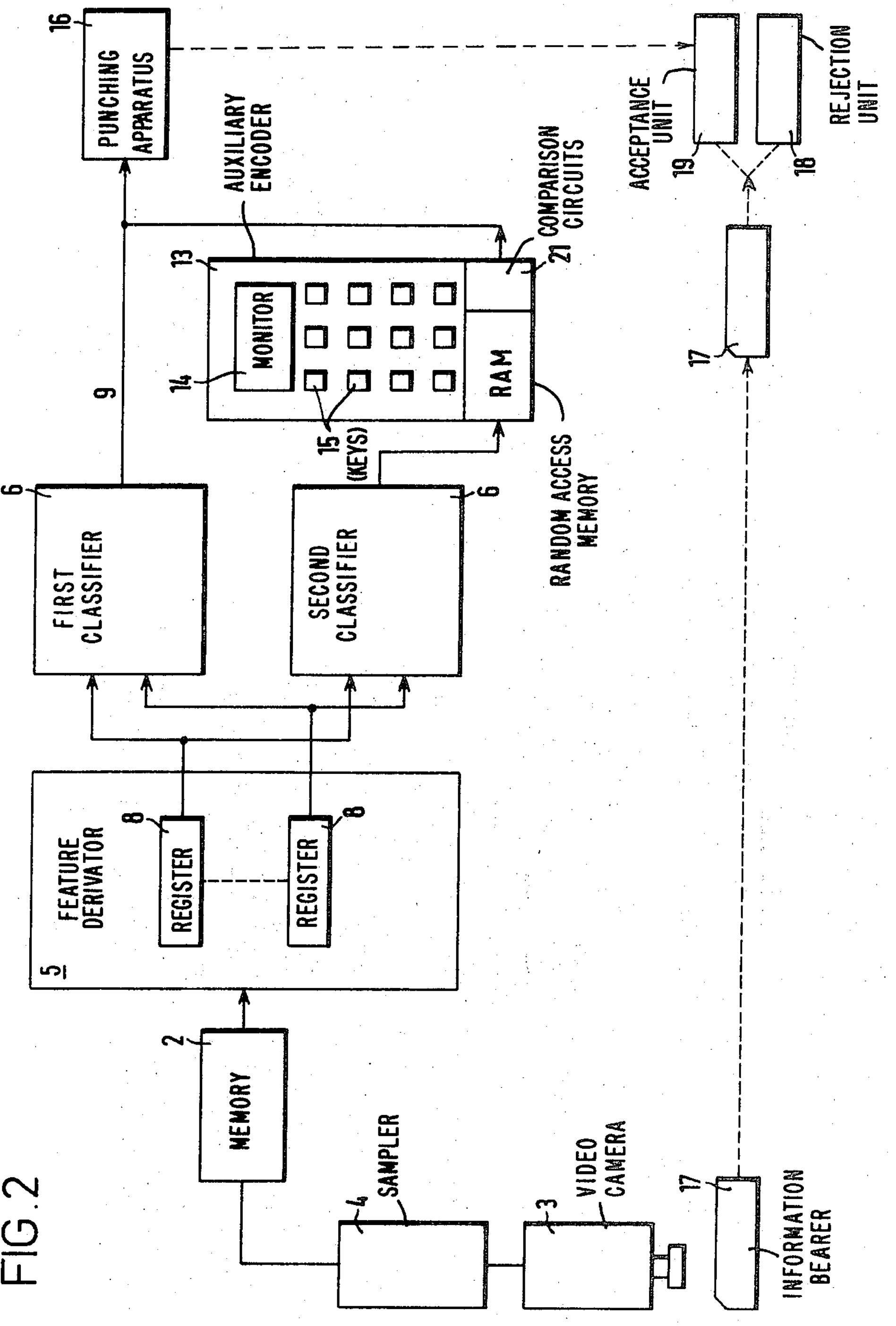
FIG. 2 shows a simplified schematic block wiring diagram similar to FIG. 1 but of a reading apparatus in accordance with the invention comprising a classification device for uncertainty symbols and an auxiliary encoding station.

In order to adapt the reading apparatus to the object contemplated by the invention, a second classification device as shown in FIG. 2 is required in the automatic reading machine 1. This second classification device obtains it information form the same feature registers 8 as the first classification device, but in the discriminators the feature values do not have to satisfy such strict conditions. The conditions are selected such that in uncertainty cases the two summation devices of the prototypes between which there is uncertainty have output values exceeding the rest. Consequently, the maximum selector should be capable of selecting not only one but also two, substantially equal, highest values.

The outputs of the two classification devices 6 are applied to the auxiliary encoding station 13 so as to exercise the required manual check on the processing in the case of a rejection.

Of course different variants of this embodiment are possible. For example, the two classifications can be performed sequentially in one device, the threshold values of which in the discriminators are reversible.

As stated above, a TV camera 3 is used for reading handwritten symbols. The arrangement may be such that a maximal number of sixteen characters per card can be seen by this TV camera 3 at the time, if an image converter 4 is used converting the elongated image on the card 17 into the 3 : 4 ratio of the TV image.

By way of example, the TV image is electronically divided into 16 squares, numbered 0 through 15, in the following manner.

| | | | |
|---|---|---|---|
| 3 | 7 | 11 | 15 |
| 2 | 6 | 10 | 14 |
| 1 | 5 | 9 | 13 |
| 0 | 4 | 8 | 12 |

The video signal can be subsequently digitalized and quantisized, after which a pattern of 32 × 32 = 1024 bits is produced per square. The complete TV image will then contain 16 × 1024 bits and these bits are stored in a memory 2 of the automatic reading machine by means of "data break" during the scanning of one field (20 msec.).

The portion 1 automatic reading machine in charge of the symbol recognition successively processes the information originating from squares 0 through 15 (consequently, one square after the other). The information of one square is transferred to a working memory 2 and remains in this memory until the recognition procedure is completed.

The final result of the recognition procedure is stored in one or more computer words having 12 bits in the following manner:

| | Addressing | | | | | | Result | | | | | |
|---|---|---|---|---|---|---|---|---|---|---|---|---|
| | Reading machine | | | | | | Recognition procedure | | | | | |
| | No. | | Square No. | | | | | | | | | |
| Bit No. | 0 | 1 | 2 | 3 | 4 | 5 | 6 | 7 | 8 | 9 | 10 | 11 |

The result of the recognition procedure can be:

| | bit **6** | bit **7** | bit **8** through **11** |
|---|---|---|---|
| *a* unambiguously recognized | 0 | 0 | the character |
| *b* not recognized | 0 | 0 | the code **12**=reject |
| *c* one provisional result | 0 | 1 | the character |
| *d* two provisional results, which are successively processed by means of two computer words. | | | |
| | first 1 | 1 | the first character |
| | and then 0 | 1 | the second character |

Consequently bit 7 indicates that no complete recognition has been effected and on the command of bit 7 the bit pattern of the square present in the working memory 2 can be transferred by means of data break from the automatic reading machine to an external 1024 bits random access memory (RAM) that may be provided in the auxiliary encoding station 13. From this RAM the bit pattern can be visualized on a monitor 14 in the auxiliary encoding station 13, after which an operator can then or still try to recognize the character shown. If no complete recognition of all characters on a card is effected, this card cannot be punched. In actual practice it will often occur that, for example, one of the 16 characters cannot be recognized mechanically.

If a recognition procedure with a rejection rate of e.g. only 6 percent would be used, this may result in the fact that in the most unfavourable case not a single card can be punched and, consequently, all cards are transferred by the machine to the rejection unit 18 in FIG. 2. The manual punching of unrecognized characters provides a 100 percent output and takes only about 6 percent of the time required for strictly manual processing.

As stated above, particularly in the case of money traffic through the postal clearing service, which does not allow any error, a check (check punching) is required, as relatively high error rates appear to occur during manual processing.

In the reading apparatus in accordance with the invention this manual check punching can be omitted, as the manual punching is performed only in cooperation with the automatic reading machine.

The manual checking or key 15 punching can only result in an actual punching operation if the keyed-in character corresponds with one of the provisional results (uncertainty characters) available as a result of the recognition procedure. This is schematically shown in FIG. 2, wherein the rejection and acceptance of the information read is indicated by units 18 and 19, respectively.

For the present the processing rate of automatic punching systems, such as the Univac 1700 punching apparatus, is restricted to maximally 60 cards per minute. An operator can easily key in four characters per second, if the images thereof are presented in a horizontale row. Therefore it is desirable to have one operator check, select, or key punch the unrecognized characters of more than one apparatus. In the case of four apparatus a maximal rejection rate of 25 percent is allowable.

In the configuration: one automatic reading machine and one auxiliary encoding station, the operator is shown a constantly varying number of characters on the viewing screen or monitor 14, as the punching apparatus 16 in FIG. 2 has to wait until all information to be punched in a card or information bearer 17 is available before the actual punching operation can take place, and the next card can be moved in front of the TV camera 3.

Often only one or two characters per card will have to be checked on keyed-in manually.

When using one auxiliary encoding station and a plurality of automatic reading machines (minimally four) the arrangement can be such that the operator is each time shown a constant number of characters on the monitor 14, for example four. In that case at least 2 × 4 and preferably 3 × 4 random access memories (each adapted to contain 1,024 bits) should be present in the auxiliary encoding station, a 2 × 12 bits register for storing data concerning the number of the automatic reading machine, number of the square, and the provisional results of the recognition procedure being coupled to each RAM.

During keying-in the data by means of the image on the monitor reproduced from the first four RAMs, the next four or eight RAMs must be in a position to be filled with information concerning the next unrecognized characters.

III AUXILIARY ENCODERS

Figure 3:
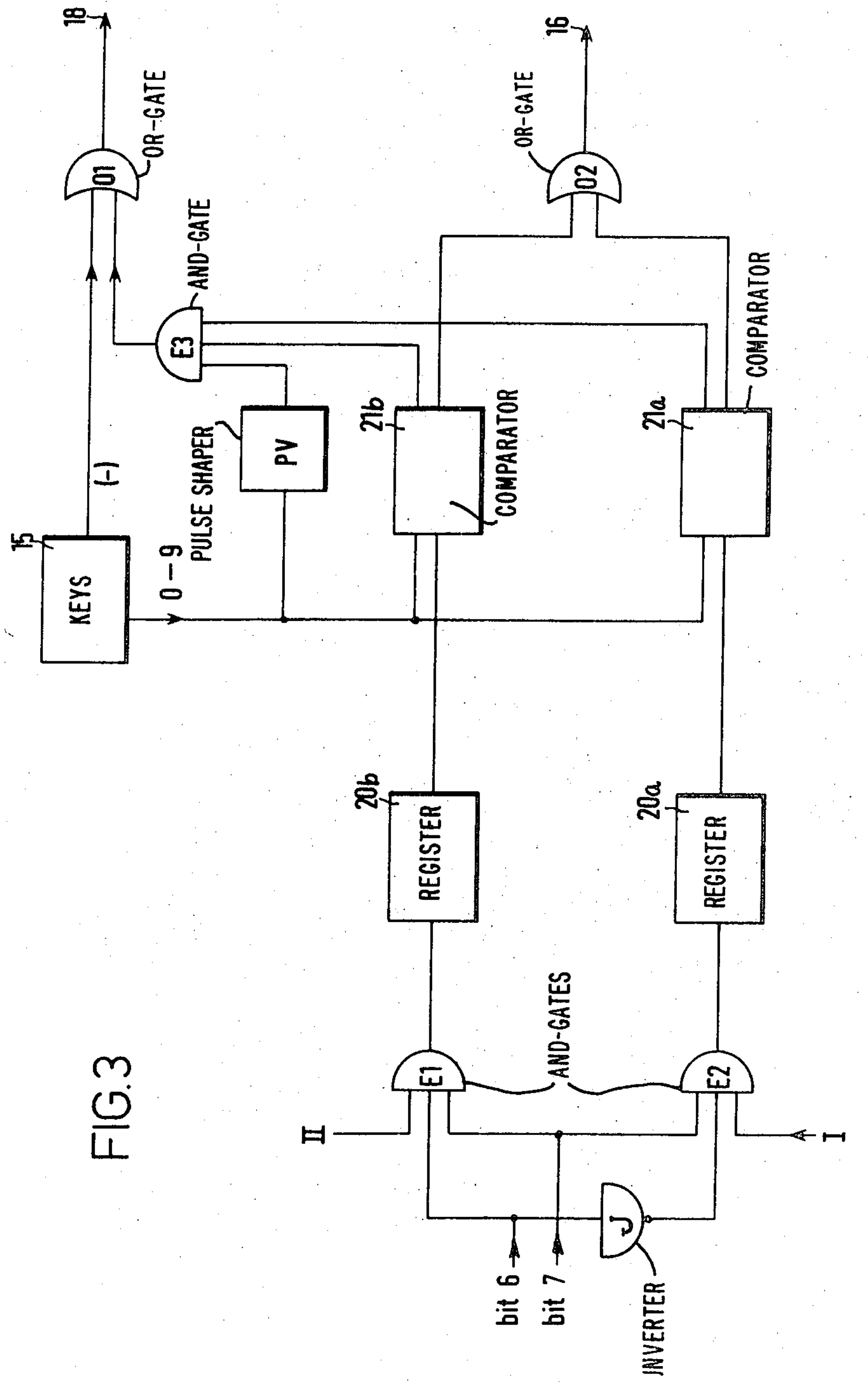
FIG. 3 shows a schematic block wiring diagram of an auxiliary encoding station for one automatic reading machine.

FIG. 3 shows a diagram of an auxiliary encoding station cooperating with a single automatic reading machine.

In the simplest form it is not necessary to store the bit pattern of an unrecognized character in a 1,024 bits RAM, as a portion of the video signal form the memory 2 can be used for showing the image of a character on the monitor.

The square number plus bit 7 ensures that the desired square of the TV image appears on the monitor 13. If bit 6 = 0 and bit 7 = 1, the one provisional result I, viz. bits 8 through 11, is stored in a four bits register 20a through an inverter J and an AND-gate E2.

Result II no. bits 8 through 11 can be stored in the other four bits register 20b through the AND-gate E1. To this end both bit 6 and bit 7 should be 1.

After depressing a key 15 it is ascertained in the four bits comparison circuits 21a and 21b whether there is correspondence between the keyed-in character and the contents of one of the two four bits registers 20a and 20b. If this correspondence is present, the keyed-in character is punched in the card through OR-gate 02. If there is no correspondence, voltages are applied to all the inputs of the AND gate E3 and the result thereof is a rejection signal at the output 18 of the OR gate 01.

This rejection signal also appears upon depressing the minus key which is depressed when the operator is unable to recognize the character shown.

As long as no key has been depressed, no correspondence will be present in the two comparison circuits. This renders it necessary to use the pulse shaper PV. As a result thereof the AND-gate E3 ascertains the state of the four bits comparison circuits 21a and 21b only directly after depressing one of the keys.

Figure 4:
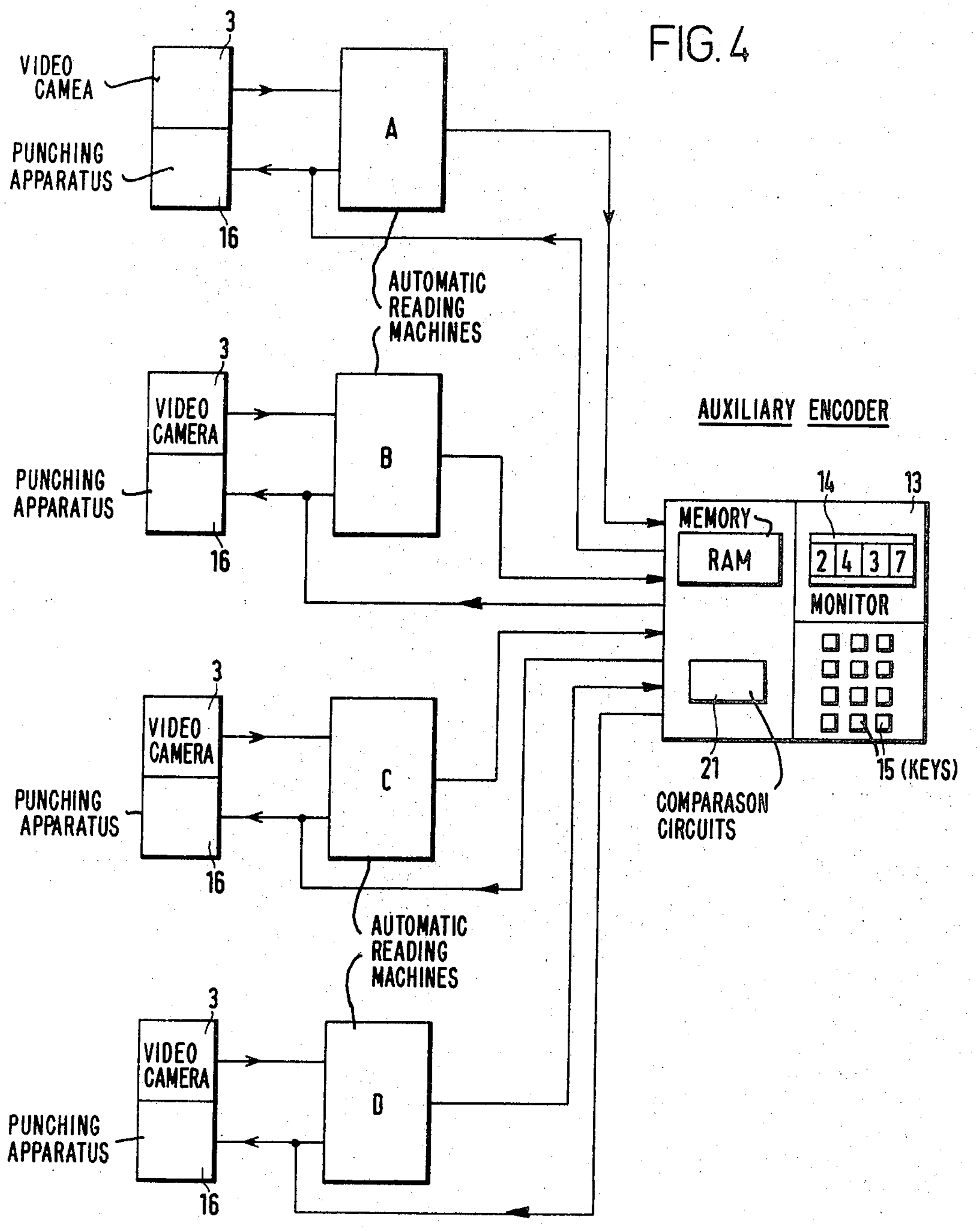
FIG. 4 shows a schematic block wiring diagram of an embodiment of a reading apparatus in accordance with the invention, wherein four automatic reading machines are coupled to a common auxiliary encoding station.
Figure 5:
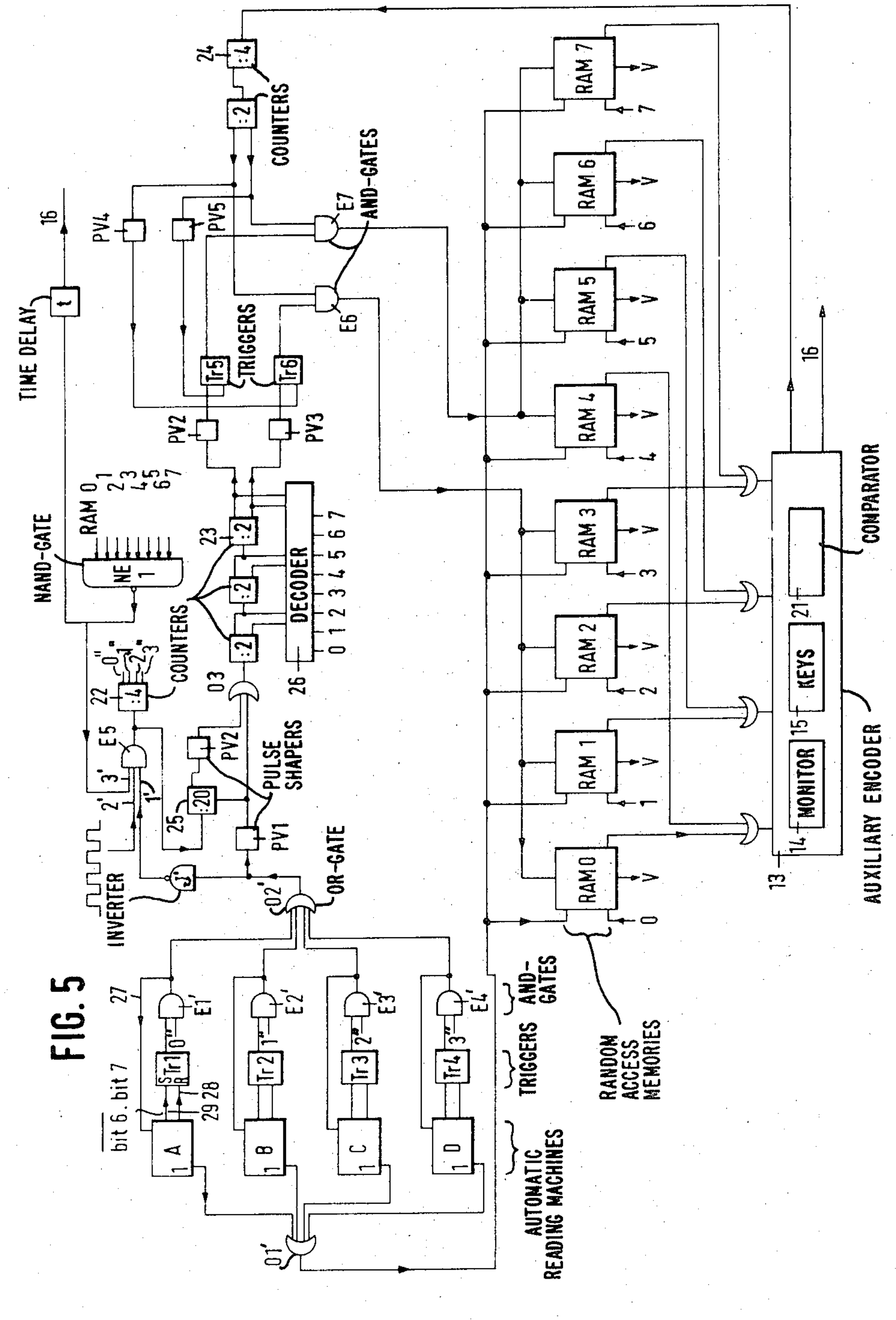
FIG. 5 shows a more detailed schematic block wiring diagram of an auxiliary encoding station for the four automatic reading machines shown in FIG. 4.

FIG. 4 schematically shows in which manner the cooperation between one auxiliary encoding station and four automatic reading machines is realized. FIG. 5 shows the arrangement in detail.

It is the intention that all four machines are used in turn. The circuit realizing this intention operates as follows. A block voltage having a period of e.g. 1 msec., is present at input 2′ of AND-gate 2 E5 in FIG. 5. For the present, input 3′ is left out of consideration. When input 1′ is positive, the divider-by-four 22 connected to AND-gate E5 will successively apply a voltage to the outputs 0′′,1′′,2′′,3′′,0′′,1′′ ... etc.

When a voltage is applied to output 0′′, and AND-gate E1′ will open as soon as a voltage is applied also to its other in-put that is, when the trigger Tr1 is set. This is the case when the automatic reading machine 1A supplies the information: bit 6 = 0 and bit 7 = 1 through the conductor 29, which is when a provisional result is processed.

The occurrence of the voltage at the output of the AND-gate E1′ has the following results:

a. The voltage at input 1′ of AND-gate E5 disappears through the OR-gate 02′ and the inverter J′, so that the divider-by-four 22 stops.

b. The divider-by-eight 23 with decoding device 26 takes a step through the pulse shaper PV1 and the OR-gate 03; as a result thereof the next free RAM is given the "in" command, for example RAM 2 (at the same time the divider-by-twenty 25 is reset).

c. The automatic reading machine 1A is given the command "beginning of data break" through conductor 27 and the transfer of 1,024 bits plus various data, such as provisional results of the recognition procedure with associated addressing, is effected from the working memory of automatic reading machine 1A through the OR-gate 01′ to RAM 2.

When all 1,024 bits and the various data have been transferred to RAM 2 with associated 2 × 12 bits register, the automatic reading machines applies the signal "end of data break" to conductor 28, thereby resetting trigger Tr1. The voltage at the output of AND-gate E1′ disappears and E5 reopens. The divider-by-four 22 now applies a voltage to the next output, so that the automatic reading machine 1B is actuated.

If this reading machine 1B does not have any output data available, trigger Tr2 is not set and, consequently, AND-gate E5 is not blocked; the divider-by-four 22 advances until it meets a reading machine that does have output data available; in this event also divider-by-eight 23 takes another step so that the next RAM obtains the input command through the numbered input via the decoding device 26, and is filled with information. The time required for transferring 1,024 bits from a reading machine to a RAM amounts to maximally 0.25 msec. Consequently, if data output is to take place at all reading machines, it takes maximally 1 msec. until the same reading machine is used again.

It may be expected that more than 60 msec are available (and required) for the recognition of one character (60 cards/minute = 1 card/second = 16 characters/second = 1 character/60 msec.). Consequently, the processing time of the reading machines is not or hardly affected by the auxiliary encoding station. However, the reaction speed of the operator is of some importance, but this importance is less as more RAMs are used.

If the operator is absent for some time, soon all 8 RAMs will be filled with information. This is established by the NAND-gate NE1 through the output $\gamma$ of the RAM in question, which NAND-gate will then prevent advancement of the divider-by-four 22 at input 3 of AND-gate E5, until four characters have been keyed-in by the operator, as a result of which four RAMs become available for storing information. A time delay t is connected to the output of the NAND-gate NE1. If the operator does not react within a given period of time, the cards that are being processed are transferred to the rejection unit 18 (FIG.2). This is to avoid the possibility that during temporary absence of the operator all reading machines will stop after a short while.

The RAMs are successively filled at the command of the divider-by-eight 23 by means of the decoding device 26. As soon as four RAMs have been filled, the information of these four RAMs is applied to the monitor 14, as the voltage at the output of the third divider-by-two of divider-by-eight 23 is inverted. The result thereof is, for example, that pulse shaper PV2 switches trigger Tr5 and applies the "out" command through AND-gate E7 to RAMs 4 through 7. The bit patterns stored in RAMs 4 through 7 are then visualized on the monitor 14 as a horizontal row of characters.

The operator has to depress a key 15 four times. If a keyed-in character is in correspondence with the provisional results of the recognition procedure, the actual punching operation takes place. When there is no correspondence, the respective card 17 is transferred to the reject unit 18. The successive depressing of four keys produces a reset pulse for Tr5 through the divider-by-eight 24 and pulse shaper PV5. As a result thereof AND-gate E7 is blocked and the image on the monitor 14 disappears.

AND-gate E6 opens as trigger soon as Tr6 is set, that is as soon as another four characters cannot be recognized by the automatic reading machines. Then the contents of RAMs 0 through 3 appear on the screen of the monitor 14 and the operator can again key in four characters.

Of course it will frequently occur that during some time very little unrecognized characters are presented by the automatic reading machines. The divider-by-twenty 25 is connected to the output of the AND-gate E5. If all four reading machines have been scanned five times without information being available, the divider-by-twenty 25 applies a pulse to the divider-by-eight 23 through pulse shapes PV2 and the OR-gate 03. As a result thereof, the next RAM obtains the "in" command. However, as no information is available, this RAM remains empty. As soon as one of the reading machines does supply information, the divider-by-twenty 25 is reset by PV1.

If, for example, during a long period of time only one reading machine presents one not fully recognized character, it takes 1 msec. + 3 × 20 msec. = 61 msec.

until the output command for four RAMs is realized. In such a case one character and three blank squares appear on the monitor 14.

The circuit described is only an example showing in which manner an auxiliary encoding station 13 can be realized. As the "quality" of the reading machines increases, more machines can be connected to one auxiliary encoding station.

Only experience can teach how long it will be desirable that only four characters are presented in a horizontal row to the operator at one time, or if a different number is desirable, or that the characters appear on two lines. However, in accordance with the principle described, it is readily possible to satisfy wishes established during actual practice without exceeding the scope of the invention. An enlargement of the number of automatic reading machines cooperating with the auxiliary encoding station is possible without drastic alterations.

We claim:

1. In an automatic reading apparatus for hand written symbols having a video camera to detect said symbols, means for storing said symbols as bits, means for encoding said stored bits, classifying means for comparing each type symbol with a single standard, and means for producing a reject signal if predetermined minimum standards are not met for the symbols, the improvement comprising:

A a second means for classifying the rejected symbols by comparison to less close standards to produce at least two classification indications for each rejected symbol, B means for monitoring the stored bits corresponding to said rejected symbols, C means for keying symbols visually corresponding to said rejected symbols shown on said monitor, and D means for selecting the rejected symbols from their classification indications corresponding to their keyed symbols for automatic reading.

2. An apparatus according to claim 1 including means for registering the encoded bits corresponding to each symbol detected.

3. An apparatus according to claim 1 wherein said improvement comprises an auxiliary encoder for a plurality of said reading machines, wherein said auxiliary encoder comprises said monitoring means, said keying means, and said selecting means.

4. An apparatus according to claim 3 including means for sequentially selecting the said reading machines for connection to said auxiliary encoder.

5. An apparatus according to claim 1 including means for monitoring a plurality of said rejected symbols on said monitor simultaneously.

6. An apparatus according to claim 1 wherein said selecting means comprises means for comparing the encoded bits from said keying means with the encoded bits from each of said two classification indications from said second classifying means.

7. An apparatus according to claim 1 wherein said symbols are written on an information bearer passed before said video camera.

8. An apparatus according to claim 7 including means for punching said bearer with a code corresponding to the resulting selected symbol.

9. An apparatus according to claim 7 including means for rejecting those information bearers which do not have all of the symbols properly selected by any of said classifying means.

10. An apparatus according to claim 7 including delay means for rejecting the information bearers if all of the symbols thereon have not been detected and properly read within a predetermined period of time.

11. In an automatic reading device for symbols written on an information bearer, having:

A a video camera to detect said symbols,

B a memory for storing the bits of the information detected by said camera,

C a feature derivator for encoding the stored bits of said detected symbols from said memory, D a classifier for selecting the sole symbol closest to a predetermined code corresponding to said symbol detected by said camera, and E means for punching said bearer with a code corresponding to that closest selected symbol, the improvement comprising:

F a second classifier for selecting at least two symbols closest to said predetermined code corresponding to said detected symbol, and G an auxiliary encoder comprising:

1 a random access memory connected to said memory for storing said bits corresponding to said detected symbol, 2 a monitor for reproducing said detected symbol which said classifier for the sole symbol closest thereto has not been able to make a definite selection, 3 a set of manually operable keys corresponding to each symbol which can be detected, and 4 a comparator for selecting that symbol selected by said second classifier corresponding to said key operated for the symbol on said monitor, and automatically operating said punching means for that said symbol.

* * * * *

PO-1050
(5/69)

UNITED STATES PATENT OFFICE
CERTIFICATE OF CORRECTION

Patent No. 3,832,682 Dated August 27, 1974

Inventor(s) Wilhelm Fredrik Brok, Arie Adriaan Spanjersberg and Joannes van Staveren It is certified that error appears in the above-identified patent and that said Letters Patent are hereby corrected as shown below:

Column 1, line 51 cancel "a"; line 52 change "carrier" to - - carriers - - line 56 cancel "of each recording carrier"; line 59 before "one" insert - - each, - - and change "is" to - - maybe - -Column 3, line 11 cancel "portion 1"; line 12 after" logic" insert - - portion 1 - - Column 4, line 30 change "it" to - - its - - , and change "form" to - - from - - Column 6, line 52 change "13" to - - 14 - - Column 7, line 5, before "." insert - - 21a and 21b - - and line 22 change "and" to - - the - -, Column 8, line 46 change "trigger soon as" to - - soon as trigger - - ; line 59, change "shapes" to - - shaper - -.

Signed and sealed this 18th day of March 1975.

(SEAL)
Attest:

RUTH C. MASON
Attesting Officer

C. MARSHALL DANN
Commissioner of Patents
and Trademarks